United States Patent
Peat

(10) Patent No.: US 12,036,958 B2
(45) Date of Patent: Jul. 16, 2024

(54) SELECTIVELY IMPLEMENTING AUTOMATED CLEANING ROUTINES DURING UNLOADING CYCLES FOR TRANSPORT VEHICLES

(71) Applicant: Deere & Company, Moline, IL (US)

(72) Inventor: Michael D. Peat, Dubuque, IA (US)

(73) Assignee: Deere & Company, Moline, IL (US)

( * ) Notice: Subject to any disclaimer, the term of this patent is extended or adjusted under 35 U.S.C. 154(b) by 525 days.

(21) Appl. No.: 17/477,632

(22) Filed: Sep. 17, 2021

(65) Prior Publication Data

US 2023/0089883 A1    Mar. 23, 2023

(51) Int. Cl.
*B60S 3/04*     (2006.01)
*B60P 1/28*     (2006.01)
*B65G 67/24*    (2006.01)

(52) U.S. Cl.
CPC ............. *B60S 3/04* (2013.01); *B60P 1/286* (2013.01); *B65G 67/24* (2013.01)

(58) Field of Classification Search
CPC .. B65G 45/12; B65G 45/16; B65G 2203/042; B65G 2203/02; B65G 43/02;
(Continued)

(56) References Cited

U.S. PATENT DOCUMENTS 1,627,336 A     5/1927  Nelson
4,709,804 A *  12/1987  Duperon ............... E02B 15/104
                                                    198/719

(Continued)

FOREIGN PATENT DOCUMENTS

DE     102020205850 A1   12/2020
WO     WO2022193036 A1    9/2022

OTHER PUBLICATIONS

Lectura Gmbh et al. "Philppi-hagenbuch load ejector system addresses material carryback for improved haul truck efficiency", https://lectura.press/en/article/philippi-hagenbuch-load-ejector-system-addresses-material-carryback-for-improved-haul-truck-efficiency/61493, Jun. 12, 2023. (Year: 2023).*

(Continued)

*Primary Examiner* — Steven B Theriault
(74) *Attorney, Agent, or Firm* — Gary L. Montle; Lucian Wayne Beavers; Patterson Intellectual Property Law, PC

(57) ABSTRACT

A system and method are provided for automated cleaning of a loading container of a transport vehicle (e.g., dump truck, ejector, scraper), wherein the loading container includes controllable elements (e.g., hydraulic lift cylinders for a truck bin, an ejector blade) for transitioning between loaded and unloaded states. Characteristics of carryback material remaining in the loading container are estimated during a detected unloaded state of the transport vehicle, wherein whether to initiate an automated cleaning stage is determined based on at least one of the estimated characteristics. Upon determining to initiate the automated cleaning stage, performance of a cleaning routine is automatically directed during or in association with an unloading stage for the loading container via the controllable elements. The elements are controlled during the cleaning routine in accordance with a severity level selected from among various progressively increasing severity levels based on at least one of the estimated characteristics.

20 Claims, 5 Drawing Sheets

(58) Field of Classification Search
CPC ........ B65G 43/00; B65G 45/26; B65G 67/24; B60P 1/286; B60S 3/04
See application file for complete search history.

(56) References Cited

U.S. PATENT DOCUMENTS

| | | | | |
|---|---|---|---|---|
| 4,839,835 | A * | 6/1989 | Hagenbuch | G07C 5/008 701/1 |
| 5,002,340 | A * | 3/1991 | Loggins | B60P 1/006 414/513 |
| 5,285,047 | A * | 2/1994 | Petrelli | H05B 3/145 219/202 |
| 6,092,863 | A | 7/2000 | Hagenbuch et al. | |
| 6,523,221 | B1 * | 2/2003 | Dahlin | B08B 9/08 15/345 |
| 7,326,023 | B2 | 2/2008 | Hagenbuch | |
| 7,918,638 | B1 * | 4/2011 | Loggins | B60P 1/283 414/469 |
| 8,333,543 | B1 * | 12/2012 | Simmons | B60P 1/006 414/416.04 |
| 8,752,372 | B2 | 6/2014 | Ramler et al. | |
| 8,948,974 | B2 | 2/2015 | Montocchio | |
| 9,073,690 | B1 * | 7/2015 | Hobson | B60P 1/283 |
| 9,221,659 | B2 * | 12/2015 | Fukasu | B66F 17/00 |
| 9,415,953 | B2 | 8/2016 | Bonefas | |
| 9,803,324 | B2 | 10/2017 | Kean et al. | |
| 9,815,479 | B2 | 11/2017 | Stander et al. | |
| 9,908,385 | B2 | 3/2018 | Chundrlik, Jr. et al. | |
| 9,962,740 | B2 * | 5/2018 | Thaler | C02F 1/004 |
| 10,479,354 | B2 | 11/2019 | Posselius et al. | |
| 10,662,613 | B2 | 5/2020 | Ready-Campbell et al. | |
| 10,968,602 | B2 * | 4/2021 | Hendricks | G06Q 10/06315 |
| 2003/0223849 | A1 * | 12/2003 | Hagenbuch | B60P 1/006 414/511 |
| 2005/0105993 | A1 * | 5/2005 | Hagenbuch | B60P 1/006 414/511 |
| 2009/0260305 | A1 * | 10/2009 | Haub | B60P 1/286 52/592.1 |
| 2012/0305025 | A1 * | 12/2012 | Helbig | E02F 9/205 15/93.1 |
| 2013/0080000 | A1 * | 3/2013 | Von der Lippe | E01C 19/004 701/50 |
| 2015/0001910 | A1 * | 1/2015 | Natarajan | B60P 1/286 298/1 H |
| 2015/0002303 | A1 * | 1/2015 | Stanley | G01G 19/08 340/666 |
| 2015/0052786 | A1 * | 2/2015 | Russell | E02F 3/6454 37/418 |
| 2015/0112954 | A1 * | 4/2015 | Collins | G06Q 10/083 707/702 |
| 2015/0307012 | A1 * | 10/2015 | Keating | B60P 1/56 298/25 |
| 2017/0253163 | A1 * | 9/2017 | Anderson | B60P 1/26 |
| 2018/0035050 | A1 | 2/2018 | Lu et al. | |
| 2018/0179732 | A1 * | 6/2018 | Bartsch | E02F 9/205 |
| 2019/0389272 | A1 * | 12/2019 | Kesani | B60P 1/28 |
| 2020/0238881 | A1 * | 7/2020 | Hendricks | E02F 9/262 |
| 2020/0239244 | A1 * | 7/2020 | Hendricks | B60P 1/283 |
| 2020/0240112 | A1 * | 7/2020 | Hendricks | E02F 9/205 |
| 2020/0247298 | A1 * | 8/2020 | Orlov | B60P 1/006 |
| 2022/0032832 | A1 * | 2/2022 | Arul | B60P 1/286 |
| 2022/0373384 | A1 * | 11/2022 | Spendlove | G01F 23/292 |
| 2023/0394650 | A1 * | 12/2023 | Steinlage | E02F 9/26 |

OTHER PUBLICATIONS

German Search Report issued in application No. DE102022208298.2 dated Mar. 21, 2023 (08 pages).

* cited by examiner

(12) United States Patent — US 12,036,958 B2

SELECTIVELY IMPLEMENTING AUTOMATED CLEANING ROUTINES DURING UNLOADING CYCLES FOR TRANSPORT VEHICLES

FIELD OF THE DISCLOSURE

The present disclosure relates generally to automated cleaning routines for loading containers of transport vehicles for carrying and dumping loaded material, and more particularly to systems and methods for selectively implementing such automated cleaning routines during unloading cycles, for example based on detected amounts or accumulation trends of carryback material in the loading containers.

BACKGROUND

Transport vehicles as discussed herein may include dump trucks, ejectors, scrapers, or the like for illustrative purposes, but may also for example include various other machines and equipment, self-propelled or otherwise, which carry loaded material from a first location to a second location for discharging/unloading from a loading container thereof.

As used herein, the term "carryback material" may refer to material which undesirably remains in the loading container of the transport vehicle after the unloading process. This may occur for any number of reasons including for example wet conditions, an inherent property of the material being transported, a configuration of the loading container, a grade of the dumping site, or the like. The presence of carryback material is undesirable at least because of the added inefficiencies in the work cycle, but also because it adds uncertainty in the estimation of the volume of material loaded and transported during the work cycle.

Conventional systems are in place for removing (or attempting to remove) at least some carryback material from the loading container, for example in the context of a dump truck bin, via manual selection of a feature which abruptly stops the motion of the truck bin at the top of or otherwise during the unloading motion. However, while such cleaning operations are important for productivity, they are relatively uncomfortable for the operator of the vehicle, not to mention potentially damaging when repeated over time. Accordingly, whether the cleaning process is performed for autonomous or manually operated vehicles, it would be desirable to only perform such operations when they were necessary or otherwise when the cleaning operation will be meaningful (i.e., the amount of material jarred out of place in the loading container justifies the undesirable aspects of the cleaning operation). It would further be desirable to tailor the cleaning operations to the actual level and persistence of the carryback material in a particular context.

BRIEF SUMMARY

The current disclosure provides an enhancement to conventional systems, at least in part by introducing a novel system and method for selectively implementing automated cleaning routines to remove carryback material in transport vehicles, for example by detecting conditions in which such cleaning routines are necessary or otherwise justified and further in some cases by selecting a severity level (e.g., of progressively increasing aggression) of the cleaning routine based on an amount of carryback material and/or an effect of preceding iterations of the cleaning routine.

In one embodiment, a method is disclosed herein is provided for automated cleaning of a loading container of a transport vehicle, the loading container comprising one or more controllable elements for transitioning between a loaded state and an unloaded state. The method comprises estimating one or more characteristics of carryback material remaining in the loading container during a detected unloaded state of the transport vehicle, and determining whether to initiate an automated cleaning stage based at least in part on at least one of the estimated one or more characteristics. Upon determining to initiate the automated cleaning stage, performance of a cleaning routine is automatically directed during an unloading stage for the loading container via the one or more controllable elements, wherein the one or more elements are controlled during the cleaning routine in accordance with a severity level selected from among a plurality of progressively increasing severity levels based at least in part on at least one of the estimated one or more characteristics.

In one exemplary aspect according to the above-referenced embodiment, the estimated one or more characteristics of the carryback material includes a weight and/or a volume of the carryback material remaining in the loading container, and whether to initiate an automated cleaning stage is determined based at least in part on comparing the estimated weight and/or volume of the carryback material to a respective defined threshold value.

In another exemplary aspect according to the above-referenced embodiment, the estimated one or more characteristics of the carryback material includes a weight and/or a volume of the carryback material remaining in the loading container, and whether to initiate an automated cleaning stage is determined based at least in part on a calculated aggregation trend for the estimated weight and/or volume of the carryback material over a plurality of unloading cycles.

In another exemplary aspect according to the above-referenced embodiment, the estimated one or more characteristics of the carryback material includes a weight and/or a volume of the carryback material remaining in the loading container, and the severity level for the automated cleaning routine is selected based at least in part on a calculated aggregation trend for the estimated weight and/or volume of the carryback material over a plurality of unloading cycles.

In another exemplary aspect according to the above-referenced embodiment, upon completing an iteration of the automated cleaning routine, the method further includes re-estimating at least one of the one or more characteristics of carryback material remaining in the loading container, and determining whether to execute at least a portion of another iteration of the automated cleaning routine, and a severity level therefor, based at least in part on the re-estimated at least one of the one or more characteristics.

In another exemplary aspect according to the above-referenced embodiment, the loading container comprises a truck bin and the one or more elements of the transport vehicle are controlled during the automated cleaning routine to regulate a raising and stopping speed of the truck bin.

The number of stops and/or a loading container position for each of a plurality of stops during the automated cleaning routine may be determined based at least in part on the selected severity level.

The automated cleaning routine may further comprise raising and lowering of the truck bin for a plurality of iterations along at least a portion of a movement arc, wherein a number of stops and/or a loading container position for each of a plurality of stops during each of the plurality of iterations are determined based at least in part on the selected severity level.

Upon completing an iteration along the at least a portion of the movement arc, the method may further include re-estimating at least one of the one or more characteristics of carryback material remaining in the loading container, and determining whether to execute another iteration of the automated cleaning routine, and a severity level therefor, based at least in part on the re-estimated at least one of the one or more characteristics.

In another exemplary aspect according to the above-referenced embodiment, the loading container may comprise an ejector wherein the one or more elements of the transport vehicle are controlled during the automated cleaning routine to regulate at least motion of an ejector blade.

In another exemplary aspect according to the above-referenced embodiment, the one or more characteristics of carryback material remaining in the loading container may comprise an amount of the carryback material remaining that is estimated at least in part using signals from a payload measuring unit associated with the transport vehicle.

In another exemplary aspect according to the above-referenced embodiment, the one or more characteristics of carryback material remaining in the loading container may comprise an amount of the carryback material remaining that is estimated at least in part using signals from one or more volume sensors.

In another exemplary aspect according to the above-referenced embodiment, a first volume sensor comprises an image data source configured to generate first signals corresponding to a first profile of the loading container when the loading container is empty, and to generate second signals corresponding to a second profile of carryback material remaining in the loading container during a detected unloaded state of the transport vehicle, and the estimated amount of the carryback material remaining comprises a volume calculated based at least in part on the detected first profile and the detected second profile.

In another embodiment as disclosed herein, a transport vehicle is provided with a loading container having one or more controllable elements for transitioning between a loaded state and an unloaded state, and a controller configured to direct the performance of steps according to the above-referenced method embodiment and optionally any one or more of the exemplary aspects associated therewith.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-6, various embodiments may now be described of a system and method for selectively implementing automated cleaning routines to remove carryback material in transport vehicles.

Figure 1:
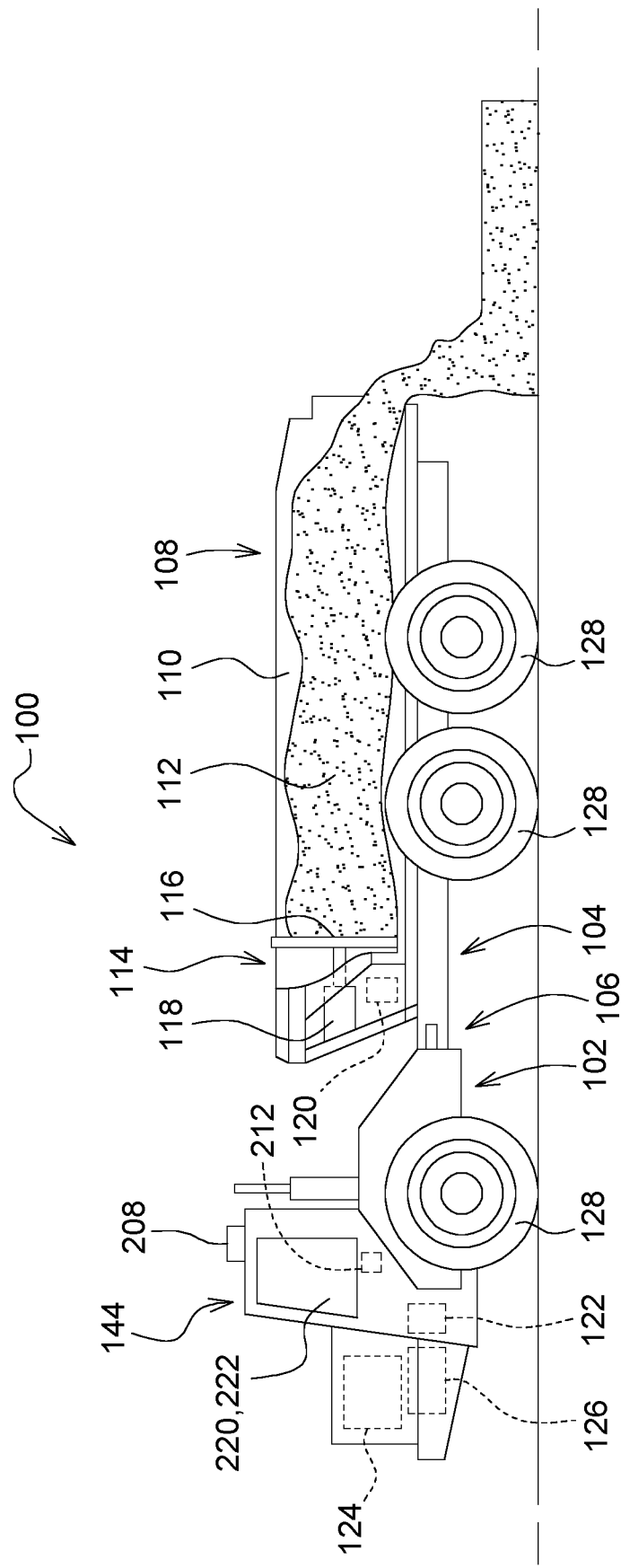
FIG. 1 is a perspective view representing an exemplary transport vehicle comprising an ejector according to the present disclosure.

In an embodiment as disclosed herein, and illustrated by reference to FIG. 1, an exemplary transport vehicle 100 may be an articulated dump truck (ADT). The transport vehicle 100 includes a front frame 102 which is connected to a rear frame 104 via an articulation joint as part of a coupling assembly 106, which allows the front frame 102 to move relative to the rear frame 104 with multiple degrees of freedom to better enable the transport vehicle 100 to traverse rough and uneven surfaces.

The transport vehicle 100 includes an ejector body 108 which is positioned on, or is integrally formed with, the rear frame 104. The ejector body 108 includes a loading container 110 such as a bin for holding a payload (or load), such as material 112. Although the term "bin" is used herein, the loading container 110 could be any type of load-carrying body.

The ejector body 108 also includes an ejection system 114 which can selectively eject the payload from the loading container 110 onto the ground behind the transport vehicle 100. The ejection system 114 is positioned toward the front of the ejector body 108, and includes an ejector 116, which may also be referred to as a headboard, and an actuator 118. The ejection system 114 operates by having the actuator 118 move the ejector 116 rearward to force material 112 out the rear end of the loading container 110.

The ejector 116 may be supported, aligned, and oriented during this motion by a retention assembly within the loading container 110. The retention assembly may be, for example, a set of guides which receive protrusions from the ejector 116, and the cooperation of the ejector 116 with these guides may keep the ejector 116 properly aligned and oriented during its movement in the loading container 110. The actuator 118 as shown is a double-acting telescoping hydraulic cylinder, but in alternative embodiments may include a non-telescoping hydraulic cylinder, a hydraulic motor, a screw or worm gear, chains, cables, or an electric motor or actuator, either alone or in combination with each other. While an articulated dump truck is illustrated in FIG. 1, the present disclosure is not limited to such a machine form and could include other machine forms with an ejector system, such as a scraper, rigid frame dump truck, on-road dump truck, rail car, or the like.

In accordance with an embodiment of a material unloading control unit 204, the actuator 118 may be controlled by the flow of hydraulic fluid from an electro-hydraulic valve 120. The electro-hydraulic valve 120 receives pressurized hydraulic fluid from a hydraulic pump 122, which is rotationally coupled to, and powered by, an engine 124 via a transmission 126. Alternatively, the hydraulic pump 122 may be directly powered by the engine 124 without an intermediate transmission. The engine 124 is disposed on the front frame 102 and powers the transport vehicle 100, including providing tractive effort delivered through transmission 126 and ground-engaging wheels 128.

The speed of the transport vehicle 100 may be displayed on a display unit 222 associated with a user interface 220 as may for example be located within an operator station mounted to the front frame 102. The display unit 222 may also display other information such as the gear of the transmission 126, the weight of the payload (load) being hauled by the transport vehicle 100, or the state of the ejector body 108 or the ejector 116 (e.g., fully retracted, extending, fully extended, retracting) as indicated by signals from an unloading state detection unit 210. The display unit 222 may also be interactive and enable an operator of the transport vehicle 100 to edit settings or parameters associated with the transport vehicle 100 through buttons, a touchscreen, or peripherals in communication with the user interface 220.

The display unit 222 may also display a current position of the transport vehicle 100, past or planned routes for the transport vehicle 100, and/or a target profile. A target profile may for example be provided by a site planning or work planning file or program which indicates a target topography of the area in which the transport vehicle 100 is operating. As a simple example, it may display a large level topography for a site where a building foundation is to be poured, even though the current topography of the site is hilly or otherwise uneven. As another example, it may display a complex topography for a site which includes roads, hills, slopes, ditches, and other three-dimensional features.

The operator may control the transport vehicle 100 through a combination of user interface 220 tools located inside the operator station, such as throttle and brake pedals and a lever which may be actuated to control the ejector 116, such as for example wherein an actuation position of the lever may control the speed at which the ejector 116 moves. Actuation of the lever in a first direction may cause the ejector 116 to move rearwards and unload material 112 from the loading container 110, while actuation of the lever in a second direction may cause the ejector 116 to move forwards and prepare the loading container 110 to receive another load of material 112.

The operator may also control the ejector 116 through a switch such as a button positioned on the lever, a detent of the lever, or an alternative user input elsewhere in the operator station. When the operator actuates the switch, it may activate an automated or semi-automated ejection mode for the transport vehicle 100 in which the ejector 116 unloads the material 112 in the loading container 110. Optionally, this automated ejection mode may include returning the ejector 116 to its forward position at the end of the cycle so the transport vehicle 100 is prepared to accept another load of material 112 in the loading container 110.

A positioning unit 208 may be provided on the transport vehicle 100. In an embodiment, the positioning unit 208 is a GNSS receiver system which determines its position and communicates that position to controllers or monitors throughout the transport vehicle 100. In other embodiments, the method or type of positioning system utilized may vary, and may include positioning systems utilizing one or more of satellite, cellular, or local positioning signals, or inertial sensors, and these systems may directly determine position or communicate with another system which determines position.

Figure 5:
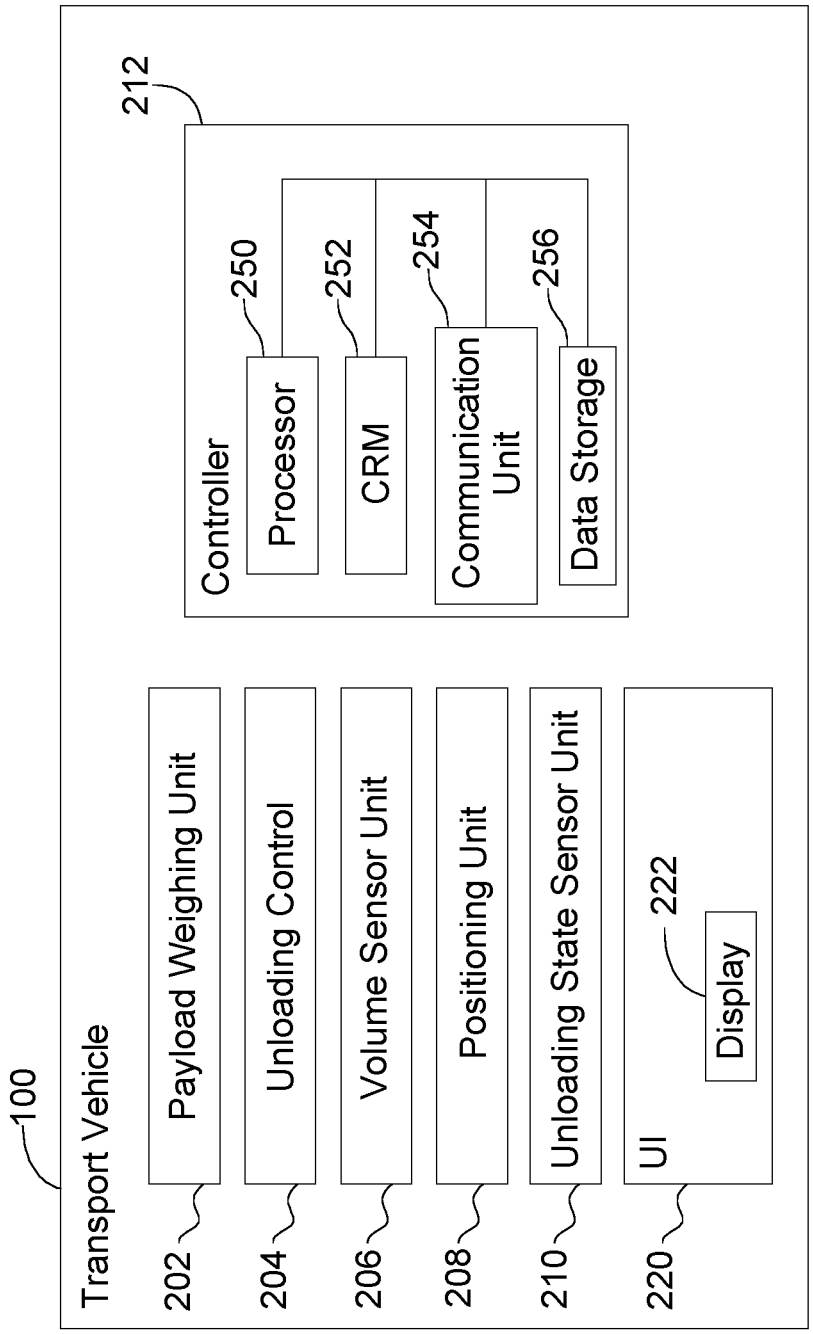
FIG. 5 is a block diagram representing a control system for the transport vehicle according to an embodiment of the present disclosure.

Referring further to FIG. 5, a controller 212 may also be provided on the transport vehicle 100. The controller 212 may be in communication with any or all of the electro-hydraulic valve 120, engine 124, transmission 126, user interface 220, a payload weighing (or measuring) unit 202, material unloading control unit 204, volumetric sensing unit 206 (as further described below), positioning unit 208, unloading state determining unit 210, display unit 222, and positioning unit 208, along with various other sensors and tools as may otherwise be described herein but not shown in the figures. The controller 212 may for example generate signals to the unloading control unit 204 to control the electro-hydraulic valve 120 to control the flow of hydraulic fluid from the hydraulic pump 122 to the actuator 118, and thereby control the speed of the ejector 116. The controller 212 may receive signals indicative of parameters of the engine 124, such as those relating to rotational speed (speed), torque, and power, and may control certain aspects of the operation of the engine 124, such as rotational speed, torque, and power. The controller 212 may communicate with the engine 124 through intermediate components, such as an engine control unit (ECU), and thus may control the engine 124 indirectly by sending commands to the ECU, which in turn controls the engine 124. Similarly, the controller 212 may receive signals indicative of rotational speed, gear or speed ratio, torque, and power of the transmission 126, and may control those some aspects of the operation of the transmission 126, including through an intermediate component such as a transmission control unit (TCU). While the controller 212 is described above as communicating with the various units such as for example the material unloading control unit 204, in various embodiments such units as the material unloading control unit 204 and the controller 212 may be integrated into a common control unit while providing substantially the same end functionality.

The controller 212 may also communicate with another controller located on the transport vehicle 100 or through a cellular or satellite communication system to a controller located remotely, such as a server or a device operated by a remote owner, operator, or fleet manager. Communication with such controllers may be utilized to set certain parameters of the controller 212, or for the controller 212 to report out parameters of the operation of the transport vehicle 100, such as the payloads hauled, the route taken, the areas which received unloaded material, etc.

Figure 2:
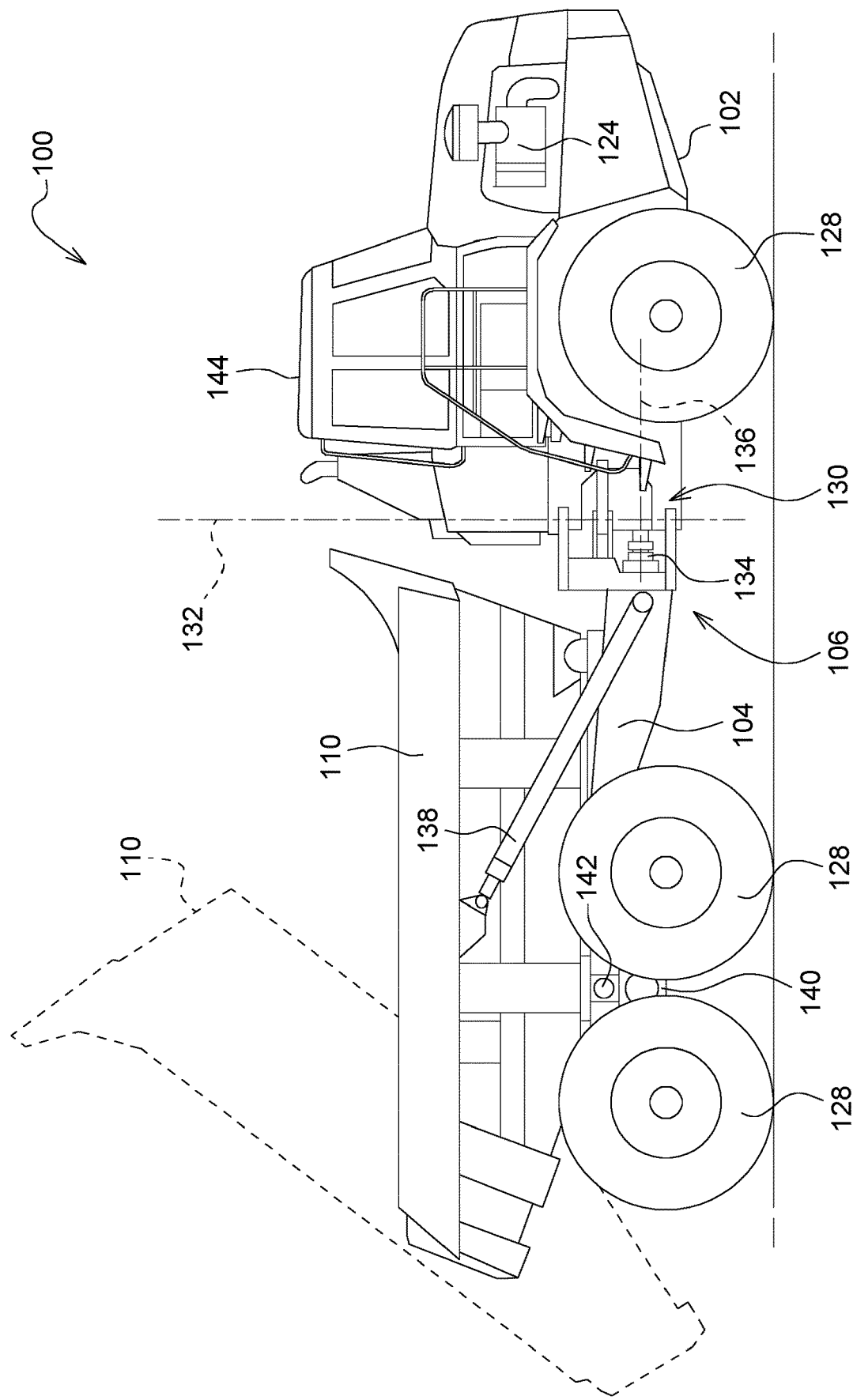
FIG. 2 is a perspective view representing an exemplary transport vehicle comprising a dump truck according to the present disclosure.

Referring next to FIG. 2, another example of a transport vehicle 100 as disclosed herein may include a chassis having a front frame 102 connected to a rear frame 104 through a coupling assembly 106. The coupling assembly 106 includes a pivot frame coupling 130 which provides for articulated movement, or turning, of the second frame relative to the first frame about a vertical axis 132. The coupling assembly 106 further includes an oscillatory frame coupling 134 which provides for pivoting movement, or oscillation, of the second frame relative to the first frame about a longitudinal axis 136. Although an articulated dump truck is shown and described herein, the features of the present disclosure may be provided on other vehicles, such as non-articulated dump trucks.

The first frame supports an operator cab 144 and an engine 124 for propelling the transport vehicle 100. A first or front wheel assembly 128 supports the front frame 102 and as shown includes a pair of wheels, but alternative ground engaging units may also be contemplated within the scope of the present disclosure such as for example tracked units.

A loading container 110 such as a bin for containing a load of material 112 is supported by the rear frame 104. An actuator, such as a hydraulic or other cylinder 138, may be coupled to the loading container 110 for angularly elevating the loading container 110 relative to the second frame (as shown in phantom in FIG. 2). Left and right rear wheel assemblies 128 support the second frame and each illustratively includes a front wheel and a rear wheel. Each of the front wheels and rear wheels are rotatably coupled to a tandem 140 or walking beam. The tandem 140 is pivotally coupled to the second frame through a pivot tandem coupling 142. Operation of the tandem 140 facilitates pivoting movement of the front wheel and the rear wheel about the pivot tandem coupling 142, thereby facilitating continuous ground engagement by the wheels. As shown in FIG. 2, the coupling 142 consists of a rigid shaft that extends from the second frame to the tandem 140 to provide the pivoting there between. Other than rotation, the coupling 142 may have a fixed position relative to the second frame so that the shaft generally moves vertically, longitudinally, and laterally with the second frame.

Figure 3:
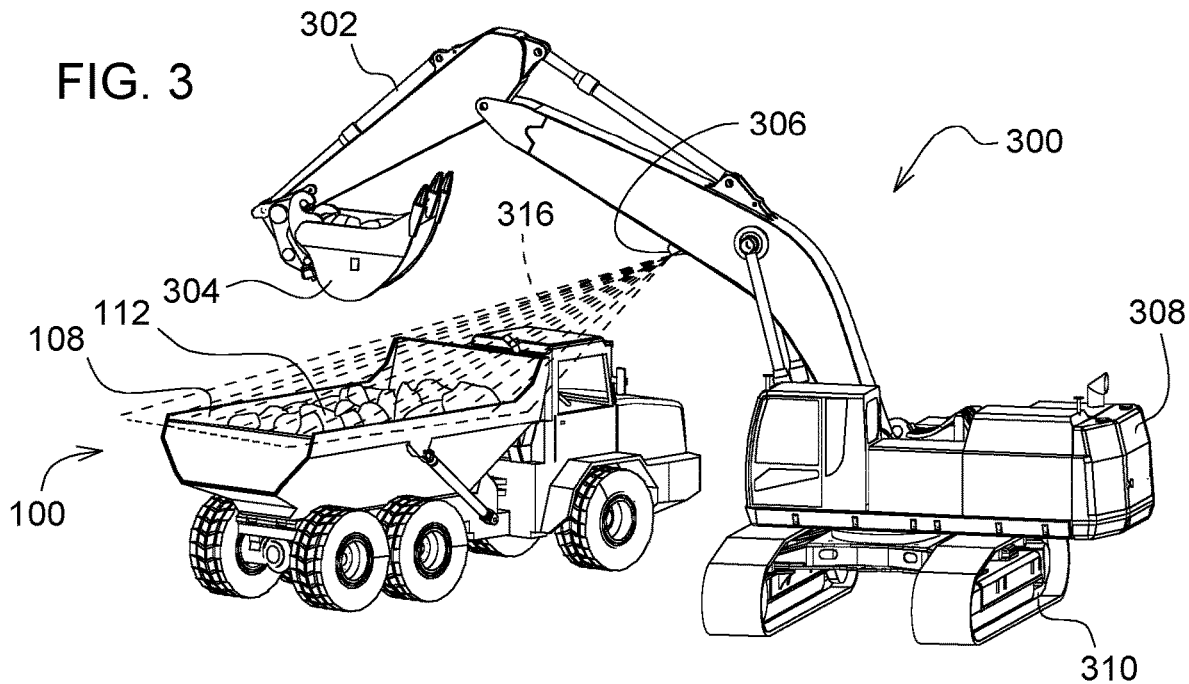
FIG. 3 is a perspective view representing an image data source located on a work machine, scanning a profile of material loaded on the transport vehicle of FIG. 2 in a first work state.

During operation, the transport vehicle 100 travels to a loading area to be loaded with material 112, such as clay, sand, soil, loam, rock, aggregate stone, blast rock, or other materials. A work machine 300 (an example of which is shown in FIG. 3) places material 112 in the loading container 110 and the transport vehicle 100 transports the material 112 loaded in the loading container 110 to a dump site. At the dump site, the transport vehicle 100 raises the loading container 110 so that material 112 slides out a back end of the loading container 110 and onto the ground. In embodiments of the present disclosure that relate to transport vehicles other than dump trucks, for example a self-propelled or towed scraper may be utilized to perform one or more of the aforementioned actions during a self- or push-loading procedure.

According to the present embodiment, and further again by reference to FIG. 5, the transport vehicle 100 includes a material unloading control unit 204 (e.g., in communication with controller 212) that controls dump cylinders 138 to raise and lower the loading container 110 and optimize the spread of the material 112 on the ground. Inputs to the controller 212 for unloading control may include the payload weighing unit 202, volumetric sensing unit 206 including for example an image data source as shown in FIG. 4, and/or other inputs.

An exemplary payload weighing or measuring unit 202 may receive inputs from a left hand load weighing sensor and a right hand load weighing sensor that detect the amount of weight supported by respective right and left hand sides of the loading container 110 to determine how much weight and material 112 is loaded into the loading container 110 and the dynamics of the load. In an embodiment, the left and right sensors may be pressure or strain gauges positioned between respective left and right ends of the coupling 142 and the tandem 140. In an alternative embodiment, the tandem 140 may be replaced by a hydraulic suspension and the weighing sensors are positioned within the hydraulic suspension. In still another embodiment, two or more of the aforementioned sensor combinations may be provided, such as for example an implementation using multiple strain gauges on tandem tire structures and multiple pressure sensors on a front tire suspension system to calculate payload weight.

An exemplary volumetric sensing unit 206 may include inputs from one or more sensors which may be located on the transport vehicle 100, external to the transport vehicle, or a combination thereof. In one example, referring again to FIG. 3, the volumetric sensing unit 206 may include or otherwise receive inputs from an image data source 306 mounted on a work implement 302 controllably extended from a main frame 308 of the work machine 300 in accordance with the present disclosure. An exemplary work machine 300 as shown is a self-propelled excavator having tracked ground engaging units 310, but various alternative work machines 300 may include wheeled ground engaging units or otherwise may be configured to load the transport vehicle 100 without being self-propelled at all. The location of the image data source 306 may be chosen such that a respective field of view 316 fully encompasses the loading container 110 of the transport vehicle 100 during at least a portion of a material loading operation as a first work state wherein the surface of the loading container 110 is retracted into a substantially horizontal orientation as shown, and may preferably be chosen such that the field of view 316 encompasses all four top edges of the loading container 110. As represented in FIG. 3, the work machine 300 is on the same level relative to the transport vehicle 100, but it may be appreciated that in various loading applications the work machine 300 may be in an elevated position relative to the transport vehicle 100 and/or at various respective orientations relative to each other. In some embodiments, a plurality of image data sources 306 or an image data source 306 that is moveable or reconfigurable in position may be provided to account for the differences in potential relative elevations, positions, and orientations with respect to a transport vehicle during loading.

Figure 4:
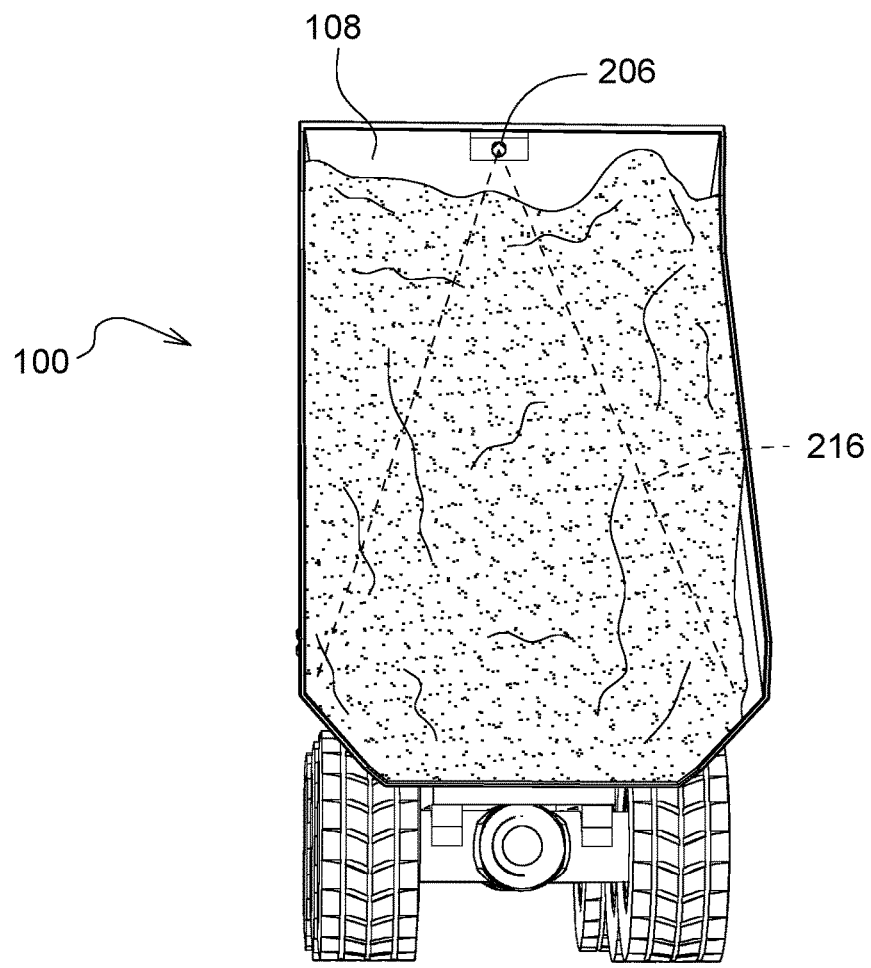
FIG. 4 is a perspective view representing an image data source located on the transport vehicle of FIG. 2, scanning a profile of material remaining in the loading container in a second work state.

In another example, referring to FIG. 4, the volumetric sensing unit 206 may include or otherwise receive inputs from another image data source 206 mounted on the transport vehicle 100. The location of the image data source 206 may be chosen such that a field of view 216 fully encompasses the loading container 110 of the transport vehicle 100 upon at least completion of a material unloading operation as a second work state wherein the surface of the loading container 110 is pivoted into an angled orientation as shown, and may preferably be chosen such that the field of view 216 fully encompasses a bottom surface of the loading container 110, or at least as much as allowed in view of any remaining (carryback) material 112 thereon.

Referring again to a system as schematically illustrated in FIG. 5, the transport vehicle includes a control system including a controller 212. The controller 212 may be part of a more comprehensive vehicle control system, or it may be a completely or partially discrete control module.

As referenced above, the controller 212 is configured to receive input signals from a volumetric sensing unit 206 which includes some or all of various image data sources 206, 306 which may collectively define an imaging system. Exemplary image data sources may include video cameras configured to record an original image stream and transmit corresponding data to the controller 212. In the alternative or in addition, exemplary image data sources may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as time-of-flight volumetric sensors within the scope of the present disclosure, including for example to provide inputs according to FIGS. 3 and 4.

The position and size of an image region recorded by, e.g., a respective camera 306 as an image data source may depend on the arrangement and orientation of the camera and the camera lens system, in particular the focal length of the lens of the camera, but may desirably be configured to capture substantially the entire loading container 110 throughout a loading operation. One of skill in the art may further appreciate that image data processing functions may be performed discretely at a given image data source if properly configured, but also or otherwise may generally include at least some image data processing by the controller 212 or other downstream data processor. For example, conventional image and/or time-of-flight imaging data from any one or more image data sources may be provided for three-dimensional point cloud generation, image segmentation, object delineation and classification, and the like, using data processing tools as are known in the art in combination with the objectives disclosed.

The controller 212 of the transport vehicle 100 may be configured to produce outputs, as further described below, to a user interface 220 associated with a display unit 222 for display to the human operator. The controller 212 may be configured to receive inputs from the user interface 220, such as user input provided via the user interface 220. Not specifically represented in FIG. 5, the controller 212 of the transport vehicle 100 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective transport vehicles 100 and/or work machines 300 may be further coordinated or otherwise interact with a remote server or other computing device for the performance of operations in a system as disclosed herein.

The controller 212 includes or may be associated with a processor 250, a computer readable medium 252, a communication unit 254, and data storage 256 such as for example a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communication unit 254 may support or provide communications between the controller 212 and external communications units, systems, or devices, and/or support or provide communication interface with respect to internal components of the transport vehicle 100. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

Figure 6:
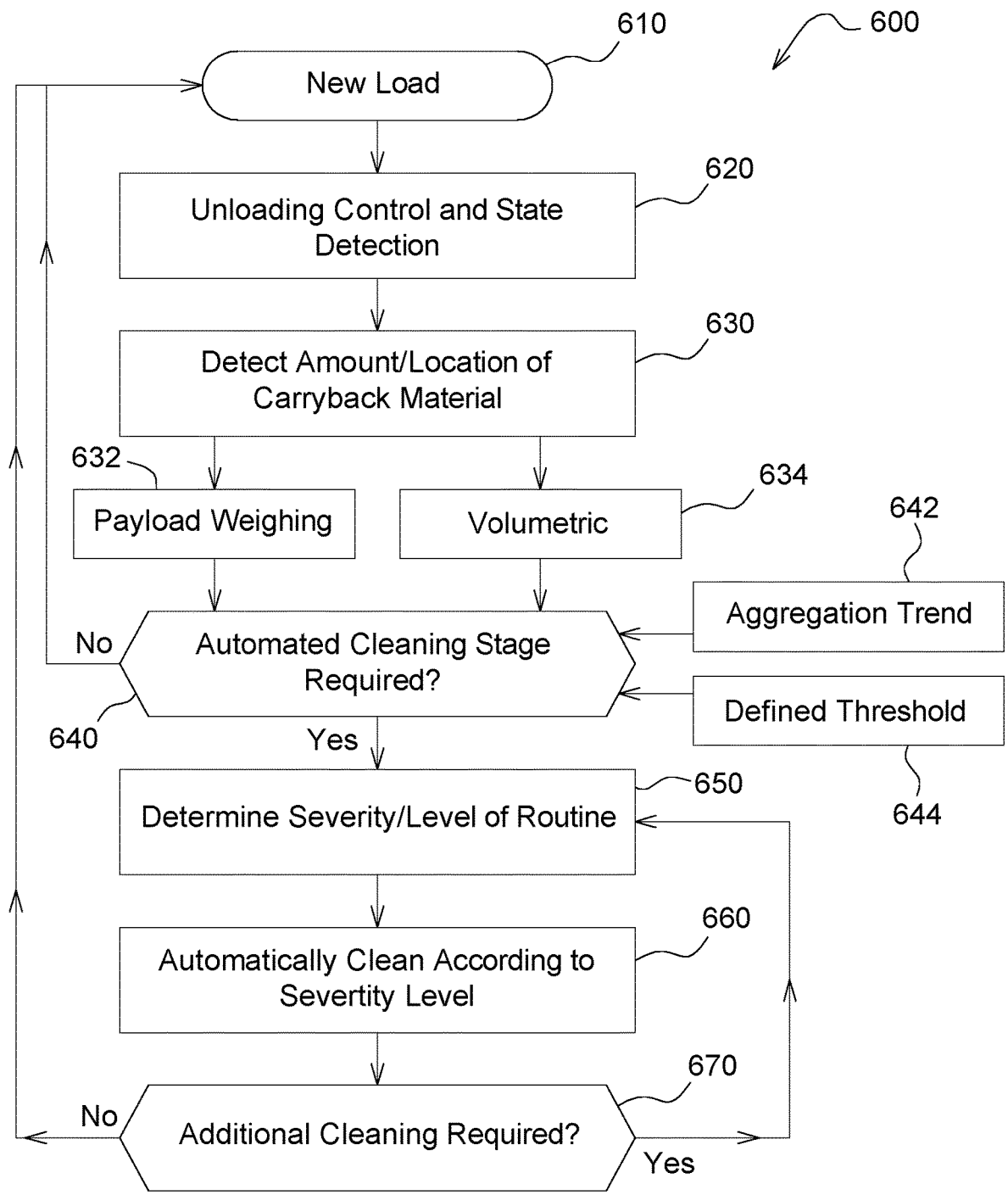
FIG. 6 is a flowchart representing an exemplary method according to an embodiment of the present disclosure.

Referring next to FIG. 6, with further illustrative reference back to FIGS. 1-5, an embodiment of a method 600 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 600 may be executed or directed by a single computing device, or via multiple computing devices in operable communication via a communications network. Exemplary such computing devices may include onboard controllers or machine control systems, remote servers, mobile user devices, and the like.

The method 600 may for example begin with a new load (step 610) of material 112 loaded into the loading container 110 of the transport vehicle 100 by a work machine 300 or the like. The transport vehicle 100 transports the material 112 to a dumping/unloading area and initiates an unloading stage, wherein a next step may include unloading control (exemplary details for which are described above) and state detection 620. The state detection 620 may for example include processing of inputs from sensors in the hydraulic cylinders, ejector system, or other elements of a material unloading control unit 204 respective to the type of transport vehicle 100, processing of inputs from sensors or image data sources capturing a pose of the loading container 110, or the like. Upon determining that the transport vehicle 100 is in, e.g., an "unloaded" state, the method 600 may continue by determining one or more characteristics (e.g., an amount and/or location) of carryback material 112 still remaining in the loading container 110, either adhering to bottom and/or side surfaces of the loading container 110 or otherwise adhering to elements of the material unloading control unit 204 such as an ejector blade (step 630).

An amount of carryback material 112 may be determined using for example a first measurement from a payload weighing unit 202 corresponding to the loading container 110 in a completely empty state and a second measurement from the payload weighing unit 202 corresponding to the loading container 110 after an unloading stage is completed or otherwise upon detecting an unloaded state 620, wherein a difference between the first and second measurements may be categorized in step 632 as a weight of the remaining carryback material 112.

In another exemplary embodiment for determining an amount of the carryback material 112, a volumetric sensing unit 206 may utilize an image data source 206 (e.g., camera, lidar sensor, radar sensor) to scan or otherwise capture data corresponding to a first profile of the loading container in a completely empty state and to scan or otherwise capture data corresponding to a second profile of the loading container 110 after an unloading stage is completed or otherwise upon detecting an unloaded state 620, wherein a difference between the first and second profiles may be processed in step 642 to determine a volume of the remaining carryback material 112 (step 634). For example, at least the second profile may be scanned and further analyzed using for example three-dimensional point cloud generation, image segmentation, object delineation and classification, and the like, using image data processing tools as are known in the art, further optionally in view of a first (or stored reference) profile corresponding to predetermined contours of the loading container 110, so as to for example estimate a volume of the material 112 loaded in the container based on the scanned second profile. The contours of the loading container 110 may be determined dynamically using the image data source, or a reference profile may be predetermined and retrieved from data storage in association with the particular transport vehicle or type of transport vehicle, or may be input directly from the user interface, etc. In an embodiment, a model may be implemented which estimates the volume of material 112 directly from the scanned profile without supplemental reference to the contours of the loading container 110 or other parameters. Such a model may be developed and implemented in the form of a look-up table based on defined levels of the material 112 relative to one or more identified contours/edges of the loading container 110 or may be incrementally refined over time using machine learning techniques, or the like.

Other embodiments may include a combination of inputs 632, 634 from the payload weighing unit 202 and the volumetric sensing unit 206, respectively, and/or a combination of inputs from sensors based on the transport vehicle and external to the transport vehicle. For example, a volumetric sensing unit 206 may be utilized in a limited fashion to check specific target areas of the loading container 110, such as the side sheets, the ejector blade, or the like, as supplementing a primary signal from the payload weighing unit 202. Similarly, an external volumetric sensor such as in association with the work machine 300 loading the transport vehicle 100 may provide a first input corresponding to parts of the loading container 110 that are not as accessible or reliably scanned by a volumetric sensor mounted on the transport vehicle 100, for example under certain conditions or relative positions of the loading container 110.

Upon determining an amount of carryback material 112 remaining in the loading container 110 at the end of an unloading stage, or at least a portion of the unloading stage or an iteration thereof, the present embodiment of a method 600 continues in step 640 by determining whether or not an automated cleaning routine is required.

In an embodiment, with reference to step 642, the system may monitor a trend of carryback material 112 accumulation over time based on a calculated aggregation of data inputs from one unloading iteration to the next. Aggregation trends may be calculated and accordingly utilized to provide non-threshold-based determinations of whether the automated cleaning stage should be performed, such as for example by enabling the prediction of future carryback material states. The system may for example include models in data storage which model likely further aggregation based on the monitored trends, and historical data/outcomes which correlate reliably thereto. As another example, a learning system may be provided and configured to learn over time that a measured current amount (e.g., mass, volume) of carryback material 112 needs to be removed as soon as possible not only because of the amount but because of how quickly it is aggregating and optionally further in view of certain detected conditions including weather conditions, a type of material 112 being transported and unloaded, and the like. In various embodiments, the system may further or in the alternative account for a detected amount and/or location of carryback material relative to a configuration of the loading container 110, including but not limited to a carrying capacity thereof.

In another embodiment, with reference to step 644, when an amount of carryback material is detected, which may refer to an initial detection of carryback material 112 associated with the loading container 110 or otherwise a detected increase in an amount of carryback material with respect to a previous analysis of the loading container 110, a counter may be incremented in the system. Once this counter exceeds a predetermined threshold value (e.g., lower limit) for automated cleaning to occur, a flag is set to perform an automatic cleaning operation during the next unloading event.

If an automated cleaning routine is not determined to be required (i.e., "no" in response to the query of step 640), the method 600 may return to step 610 with the next load and refrain from automated cleaning during the next unloading event.

If however the system determines that an automated cleaning routine is required (i.e., "yes" in response to the query of step 640), the method 600 may optionally further include a step of determining a desired severity or level of aggressiveness associated with the cleaning routine (step 650). In various embodiments, an automated cleaning operation as disclosed herein may have multiple levels of aggressiveness, wherein for example a first cleaning iteration may be performed at the lowest level of aggressiveness and the level of aggressiveness is progressively increased with subsequent iterations if the carryback detected counter continues to increase (i.e., the current level of aggressiveness is not sufficiently removing the carryback material 112). In some embodiments, an initial iteration of the cleaning routine may be provided with a higher level of aggressiveness corresponding to an amount of carryback material 112, a location of the carryback material 112, or other characteristics of the carryback material 112 or current conditions that may be detected as indicators that the carryback material 112 will require more aggressive intervention for removal. For example, it may be learned over time that a certain measured amount of carryback material 112 will be more difficult to remove under certain conditions including weather conditions, a type of material 112 being transported and unloaded, and the like.

The method 600 may further continue with performance of the automated cleaning routine in accordance with the determined severity level (step 660). Such automated cleaning routines may generally comprise controllably regulating movements, or otherwise stated the introduction of unconventional movements, of one or more controllable elements having certain conventional movements associated with the discharge of material 112 from the loading container 110. If additional cleaning is not required after the current iteration of the routine (i.e., "no" in response to the query of step 670), the automated cleaning routine is stopped or at least suspended and the method 600 may return to step 610 with the next load and refrain from automated cleaning during the next unloading event. If additional cleaning is however deemed to be required (i.e., "yes" in response to the query of step 670), the method 600 may return to step 650 and determine a severity level, or for example an increased level of aggressiveness for a next iteration of the cleaning routine.

Depending on a designated level of aggressiveness, and whether or not multiple levels of aggressiveness may be provided in iterations of the routine for a given embodiment, the automated cleaning routine for a transport vehicle 100 such as shown in FIG. 2 may include any or all of a single hard stop at the end of a stroke, performing multiple hard stops at different loading container positions close to the end of stroke, automating a lower and raise cycle in a portion (e.g., the last ten percent) of the stroke with multiple hard stops performed on each raise cycle, and the like. In various embodiments, increasing levels of aggressiveness may correspond to an increased number of interventions (e.g., stops in the raise cycle), an increased speed in the raise cycle leading up to a stop, or the like. In certain embodiments, an automated cleaning routine may incorporate randomness in the number and position of the interventions, and/or incorporate alternative frequencies of such number and position of the interventions for an identified severity level of the carryback material and/or based on stored models from which the automated cleaning routine may have been generated. Such models may be based on for example historical correlations of successful material removal with intervention combinations, wherein a model may be selected based on any one or more of characteristics including for example a type of transport vehicle 100, a configuration of loading container 110, an amount of carryback material 112, a location of carryback material 112, a configuration of carryback material 112, one or more environmental or other relevant external conditions, or the like as may be stored in memory and associated with respective outcomes.

In an embodiment, if the carryback material 112 is still detected after a certain number of iterations, after a cleaning routine of a certain level of aggressiveness has been performed, or if analysis of historical data and/or available cleaning routines indicates that a favorable outcome from further automated cleaning routines is unlikely, etc., the system may be configured to generate a message and/or audiovisual alert to the operator that manual cleanout is recommended (e.g., removing carryback material from the loading container 110 using an excavator work implement 302), or otherwise prompting the operator for manual instruction or approval regarding continued iteration of cleaning functions. In certain embodiments, it may be understood that no cleaning routine outcome may explicitly prevent an operator from directing the transport vehicle to return for another load and otherwise continuing to be as productive as possible with whatever carryback is stuck in the loading container. However, the system may continue to provide feedback regarding the accumulation of carryback material as decision support for subsequent iterations, and in some embodiments it may further be understood that the system may at some point at least direct said feedback to remote and/or administrative users for confirmation as to continued use, if not explicitly disable continued use without further cleaning operations. In autonomous vehicle implementations, it may be understood that continued operation based on commands from a first user may prompt confirmation from at least a second user if the amount or rate of accumulation of carryback material is of sufficient concern.

One of skill in the art may appreciate other aspects that may be implemented for automated cleaning routines in accordance with other types of transport vehicles 100. For example, an automated cleaning routine for a transport vehicle 100 such as shown in FIG. 1 may include ejector cleaning by dithering the ejector blade back and forth during at least a portion of the unloading motion, and/or by ramming against the end of stroke stops. On transport vehicles 100 with tailgates, an exemplary automated cleaning routine may further or in the alternative include dropping or otherwise causing the tailgate to forcibly engage the loading container 110 at one or more points of time during or immediately after the unloading stage.

In an embodiment wherein the transport vehicle 100 comprises a scraper, one of skill in the art may appreciate that use of the associated lift and gate functions in combination with the ejector as stated above could create adequate cleaning methods, depending for example on the determined level of aggressiveness required for a particular severity level of the automated cleaning routine.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for automated cleaning of a loading container of a transport vehicle, the loading container comprising one or more controllable elements for transitioning between a loaded state and an unloaded state, the method comprising:
   estimating one or more characteristics of carryback material remaining in the loading container during a detected unloaded state of the transport vehicle;
   determining whether to initiate an automated cleaning stage based at least in part on at least one of the estimated one or more characteristics; and
   upon determining to initiate the automated cleaning stage, automatically directing performance of a cleaning routine during an unloading stage for the loading container via the one or more controllable elements,
   wherein the one or more elements are controlled during the cleaning routine in accordance with a severity level selected from among a plurality of progressively increasing severity levels based at least in part on at least one of the estimated one or more characteristics,
   wherein the loading container comprises an ejector and the one or more elements of the transport vehicle are controlled during the automated cleaning routine to regulate at least motion of an ejector blade.

2. The method of claim 1, wherein:
   the estimated one or more characteristics of the carryback material includes a weight and/or a volume of the carryback material remaining in the loading container, and
   whether to initiate an automated cleaning stage is determined based at least in part on comparing the estimated weight and/or volume of the carryback material to a respective defined threshold value.

3. The method of claim 1, wherein:
the estimated one or more characteristics of the carryback material includes a weight and/or a volume of the carryback material remaining in the loading container, and
whether to initiate an automated cleaning stage is determined based at least in part on a calculated aggregation trend for the estimated weight and/or volume of the carryback material over a plurality of unloading cycles.

4. The method of claim 1, wherein:
the estimated one or more characteristics of the carryback material includes a weight and/or a volume of the carryback material remaining in the loading container, and
the severity level for the automated cleaning routine is selected based at least in part on a calculated aggregation trend for the estimated weight and/or volume of the carryback material over a plurality of unloading cycles.

5. The method of claim 1, further comprising:
upon completing an iteration of the automated cleaning routine, re-estimating at least one of the one or more characteristics of carryback material remaining in the loading container; and
determining whether to execute at least a portion of another iteration of the automated cleaning routine, and a severity level therefor, based at least in part on the re-estimated at least one of the one or more characteristics.

6. The method of claim 1, wherein the loading container comprises a truck bin and the one or more elements of the transport vehicle are controlled during the automated cleaning routine to regulate a raising and stopping speed of the truck bin.

7. The method of claim 6, wherein a number of stops and/or a loading container position for each of a plurality of stops during the automated cleaning routine are determined based at least in part on the selected severity level.

8. The method of claim 7, wherein the automated cleaning routine comprises raising and lowering of the truck bin for a plurality of iterations along at least a portion of a movement arc, and a number of stops and/or a loading container position for each of a plurality of stops during each of the plurality of iterations are determined based at least in part on the selected severity level.

9. The method of claim 8, comprising:
upon completing an iteration along the at least a portion of the movement arc, re-estimating at least one of the one or more characteristics of carryback material remaining in the loading container; and
determining whether to execute another iteration of the automated cleaning routine, and a severity level therefor, based at least in part on the re-estimated at least one of the one or more characteristics.

10. The method of claim 1, wherein the one or more characteristics of carryback material remaining in the loading container comprise an amount of the carryback material remaining that is estimated at least in part using signals from a payload measuring unit associated with the transport vehicle.

11. The method of claim 1, wherein the one or more characteristics of carryback material remaining in the loading container comprise an amount of the carryback material remaining that is estimated at least in part using signals from one or more volume sensors.

12. The method of claim 11, wherein a first volume sensor comprises an image data source configured to generate first signals corresponding to a first profile of the loading container when the loading container is empty, and to generate second signals corresponding to a second profile of carryback material remaining in the loading container during a detected unloaded state of the transport vehicle, and wherein the estimated amount of the carryback material remaining comprises a volume calculated based at least in part on the detected first profile and the detected second profile.

13. A transport vehicle comprising:
a loading container comprising an ejector and having one or more controllable elements for transitioning between a loaded state and an unloaded state; and
a controller configured to
estimate one or more characteristics of carryback material remaining in the loading container during a detected unloaded state of the transport vehicle,
determine whether to initiate an automated cleaning stage based at least in part on at least one of the estimated one or more characteristics, and
upon determining to initiate the automated cleaning stage, to automatically direct performance of a cleaning routine during an unloading stage for the loading container via the one or more controllable elements,
wherein the one or more elements are controlled during the cleaning routine in accordance with a severity level selected from among a plurality of progressively increasing severity levels based at least in part on at least one of the estimated one or more characteristics,
wherein the one or more elements of the transport vehicle are controlled during the automated cleaning routine to regulate at least motion of an ejector blade, and the controller is further configured:
upon completing an iteration of elector blade motion according to the automated cleaning routine, to re-estimate at least one of the one or more characteristics of carryback material remaining in the loading container, and
determine whether to execute another iteration of the automated cleaning routine, and a severity level therefor, based at least in part on the re-estimated at least one of the one or more characteristics.

14. The transport vehicle of claim 13, wherein:
the estimated one or more characteristics of the carryback material includes a weight and/or a volume of the carryback material remaining in the loading container, and
whether to initiate an automated cleaning stage is determined based at least in part on comparing the estimated weight and/or volume of the carryback material to a respective defined threshold value.

15. The transport vehicle of claim 13, wherein:
the estimated one or more characteristics of the carryback material includes a weight and/or a volume of the carryback material remaining in the loading container, and
whether to initiate an automated cleaning stage is determined based at least in part on a calculated aggregation trend for the estimated weight and/or volume of the carryback material over a plurality of unloading cycles.

16. The transport vehicle of claim 13, wherein:
the estimated one or more characteristics of the carryback material includes a weight and/or a volume of the carryback material remaining in the loading container, and the severity level for the automated cleaning routine is selected based at least in part on a calculated aggregation trend for the estimated weight and/or volume of the carryback material over a plurality of unloading cycles.

17. The transport vehicle of claim 13, wherein the loading container comprises a truck bin and the one or more elements of the transport vehicle are controlled during the automated cleaning routine to regulate a raising and stopping speed of the truck bin, and wherein a number of stops and/or a loading container position for each of a plurality of stops during the automated cleaning routine are determined based at least in part on the selected severity level.

18. The transport vehicle of claim 17, wherein:
the automated cleaning routine comprises raising and lowering of the truck bin for a plurality of iterations along at least a portion of a movement arc, and a number of stops and/or a loading container position for each of a plurality of stops during each of the plurality of iterations are determined based at least in part on the selected severity level, and the controller is further configured:
upon completing an iteration along the at least a portion of the movement arc, to re-estimate at least one of the one or more characteristics of carryback material remaining in the loading container, and determine whether to execute another iteration of the automated cleaning routine, and a severity level therefor, based at least in part on the re-estimated at least one of the one or more characteristics.

19. The transport vehicle of claim 13, wherein the one or more characteristics of carryback material remaining in the loading container comprise an amount of the carryback material remaining that is estimated at least in part using signals from a payload measuring unit associated with the transport vehicle.

20. The transport vehicle of claim 13, wherein:
the one or more characteristics of carryback material remaining in the loading container comprise an amount of the carryback material remaining that is estimated at least in part using signals from one or more volume sensors;

a first volume sensor comprises an image data source configured to generate first signals corresponding to a first profile of the loading container when the loading container is empty, and to generate second signals corresponding to a second profile of carryback material remaining in the loading container during a detected unloaded state of the transport vehicle; and the estimated amount of the carryback material remaining comprises a volume calculated based at least in part on the detected first profile and the detected second profile.

* * * * *